3,118,275
SOLID PROPELLANT COMPOSITION AND METHOD OF PROPULSION USING METAL OXIDES

Joseph H. McLain, Chestertown, Md., and Charles T. Rittenhouse, Marion, Ill., assignors to Olin Mathieson Chemical Corporation, a corporation of Virginia
No Drawing. Filed Feb. 12, 1960, Ser. No. 8,245
12 Claims. (Cl. 60—35.4)

The invention relates to solid propellant compositions and in particular, to solid propellant compositions comprising an intimate admixture of a light metal selected from the group consisting of lithium, beryllium and aluminum and a metal oxide. This invention also relates to jet propulsion.

Solid propellant compositions, as is well known in the art, are conventionally prepared by forming into suitable shapes or grains, as by molding, extruding, or pressing, an intimate admixture which contains a solid fuel and a solid oxidizer. Such shapes must have certain characteristics in order that they will perform satisfactorily. They must be able to withstand the pressure developed during burning which is of the order of approximately 200 to 2000 p.s.i.a. in order that they will burn evenly. In addition, the shapes should be free from mechanical flaws and be homogeneous so that they will burn at approximately the same rate over all exposed surfaces as long as the pressure during burning is constant. Furthermore, the shapes must be sufficiently strong so that stresses due to non-uniform pressures developed during burning or to vibration or shocks will not cause them to crack or shatter prior to or during the burning.

The propellant compositions of this invention are suitable for rocket power plants and other jet-propelled devices. The novel compositions burn with high flame speeds, and are of the high specific impulse type. Probably the single most important factor in determining the performance of a propellant charge is the specific impulse; appreciable increases in performance will result from the use of higher specific impulse materials.

Propellant compositions of this invention are capable of being formed into a wide variety of grains, tablets and shapes, all with desirable mechanical and chemical properties. When ignited by conventional means, such a pyrotechnic-type igniter, these propellant compositions burn uniformly without disintegration and are mechanically strong enough to withstand ordinary handling.

In formulating the solid propellant compositions of this invention, generally from about 10 to about 40 parts by weight of the finely divided light metal, for example, aluminum, and from 90 to about 60 parts by weight of a metal oxide such as cupric oxide or manganese dioxide are present in the final mixture. In the propellant, the light metal and metal oxide are formulated in intimate admixture with each other, as by finely subdividing each of the materials separately and thereafter intimately admixing them. As the art is well aware, the purpose of doing this to provide proper burning characteristics in the final propellant. Suitable oxides include, for example, the oxides of copper, chromium, manganese, iron and cobalt.

Grains and shapes can be prepared by pressing the intimately admixed light metal oxide in a powder press at pressures of from about 500 to about 5000 p.s.i.a. A sintered grain can be prepared by placing the required weight of the intimately admixed light metal and metal oxide in a sintering vessel or mold and applying mechanical pressure to the mass with simultaneous heating. Mechanical pressure is applied to the charge only after it has been heated in the sintering vessel and the entrapped air has been allowed to escape. To avoid entrapped air in the final grain, sintering is carried out under vacuum conditions.

In addition to the metal oxide and the oxidizable material, the final propellant of this invention can also contain a binder. A wide variety of binders can be employed such as cellulose nitrate, linseed oil, casein, asphalt, asphalt and oil mixtures, vegetable oil pitch, coal tar pitch, ethyl cellulose, polystyrene, polyvinyl acetate, natural rubber, phenol-formaldehyde resin, urea-formaldehyde resin, and mixtures of rubber and synthetic resins. The function of the binder is to give the propellant mechanical strength and at the same time improve its burning characteristics. Thus, in manufacturing a suitable propellant composition, proper proportions of the finely divided light metal and finely divided metal oxide can be admixed with a high solids content solution of a partially condensed urea-formaldehyde or phenol-formaldehyde resin, the proportions being such that the amount of the resin is about 1 to about 15 percent by weight, based upon the weight of the light metal and the metal oxide. The ingredients are thoroughly mixed with simultaneous removal of the solvent, and following this, the solvent-free mixture is molded into the desired shape as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

The propellant compositions of this invention when ignited produce large volumes of hot reaction products which are useful for many purposes including imparting thrust to jet-propelled devices such as rockets. In a rocket the novel propellant composition in the form of a grain, for example, is confined in a chamber which preferably is closed except for a constricted exhaust nozzle. In firing the rocket the propellant composition is ignited by means of a pyrotechnic device or by other suitable means and the resultant reaction products which contain principally gaseous monatomic molecules are expelled from the chamber through the exhaust nozzle thus producing a reaction thrust on the rocket.

The performance of a solid propellant is closely related to its specific impulse, $I_{sp}$, which may be calculated by the following formula:

$$I_{sp} = k\sqrt{\frac{\Delta H}{M}} = k\sqrt{\Delta H} \cdot \sqrt{\frac{1}{M}}$$

where $k$ is a constant, $\Delta H$ is the heat of combustion per pound of propellant and $M$ is the mean molecular weight of the gaseous products leaving the rocket. The specific impulse of a given propellant system when calculated by the formula above compares favorably with the value obtained from experimental firings. As long as the exhaust gases contain polyatomic molecules, such as $H_2O$, $CO_2$, HCl, NO, etc., which have the possibility of absorbing energy in the form of rotation or vibration, this equation appears to give values which compare well with experimental results. However, in the propellant composition of this invention the exhaust contains principally a monatomic gas, for example, gaseous copper or manganese, rather than polyatomic molecules and, in this case, the expression $$\sqrt{\frac{1}{M}}$$

becomes a secondary and probably a misdirecting criterion. When polyatomic gaseous molecules make up the exhaust gases, as is the case with propellant compositions in use today, as much as 60 to 70 percent of the energy released when the propellant is fired is used up in producing rotational and vibrational motion in the polyatomic molecules, about 15 to 25 percent of the energy released is used up to produce translational motion of the molecules which is the only type of motion producing thrust and the remainder of the energy released is utilized in expansion of the gases formed. A molecule of gas driving from a burning propellant surface imparts a thrust proportional to its mass times the square of its translational velocity. The amount of energy dissipated in the rotational and vibrational modes is directed proportional to the weight of the atoms or M. Consequently, when polyatomic molecules are formed in the burning process exhaust gases with the lowest possible molecular weights must be selected if even a reasonable efficient conversion of thermal energy into the kinetic energy of the exhaust jet is to be otained. In the propellant compositions of this invention the exhaust contains principally a monatomic gas, for example, gaseous copper or manganese. When the exhaust products are monatomic almost all of the energy released is converted into thrust producing translational motion, and no energy is expended for vibrational or rotational motion.

One of the needs of the propellant industry, especially in connection with the firing of extremely large grains, is for a pressure-temperature stable ignition mixture which will supply enough heat uniformly over the burning face of the grain to simultaneously ignite the entire burning area. The novel propellant compositions of this invention are useful as igniters in that they provide a highly useful means for the instantaneous ignition of the entire burning face of the main propellant grain since, on firing, an incandescent metal aerosol system is formed and, in addition, very high temperatures are developed.

EXAMPLE I

A mixture of 20 parts by weight of finely divided aluminum (95 percent through 200 mesh) and 80 parts by weight of finely divided cupric oxide (95 percent through 200 mesh) was prepared by dry screening and blending. To the dry mix there was added, with mixing, 20 parts by weight of cellulose nitrate-acetone solution (6 percent cellulose nitrate). The resultant mix was allowed to partially dry in air maintained at room temperature and was then granulated through a 20 mesh screen. The granules formed were dried in air for about 10 hours to remove the remaining solvent. About 158 grams of the granules were pressed into a wound chip board paper tube which was 12 inches in length (I.D.—⅝ inch) and which was closed at the forward end by a clay plug. The tube was then clamped to a wire cable. The propellant charge in the tube was ignited by means of a pyrotechnic-type igniter and the tube traveled along the 50 ft. cable with a higher velocity than an identical tube loaded with the same weight of double-base propellant.

EXAMPLES II–IV

A number of other propellant compositions were prepared from aluminum, cupric oxide and cellulose nitrate in same manner as described in Example I. These propellant compositions were tested as set forth in Example I and in all cases when the propellant compositions were ignited, the paper tubes containing the cupric oxide-aluminum-cellulose nitrate propellant composition traveled at a higher velocity than that exhibited by an identical tube loaded with double-base propellant. The proportions of aluminum, cupric oxide and cellulose nitrate-acetone solution used to prepare these propellant compositions are given in Table I which follows:

*Table I*

| Example | Parts by weight of cupric oxide [1] | Parts by weight of aluminum [1] | Parts by weight of cellulose nitrate-acetone solution (6 percent cellulose nitrate) |
|---|---|---|---|
| II | 60 | 40 | 20 |
| III | 70 | 30 | 20 |
| IV | 90 | 10 | 20 |

[1] The particle size of the aluminum and cupric oxide was the same as that utilized in Example I.

EXAMPLE V

A mixture of 30 parts by weight of finely divided aluminum (95 percent through 200 mesh) and 70 parts by weight of finely divided technical grade manganese dioxide (about 85 percent through 200 mesh) containing about 85 percent $MnO_2$ is prepared by dry screening and blending. To the dry mix there is added, with mixing, 20 parts by weight of a solution of natural rubber in benzene (approximately 5 percent by weight natural rubber). The mix is partially dried in air at room temperature and then is passed through a 20 mesh screen forming a granulated product. Next the granules are dried in air at room temperature for about 10 hours to remove the remaining solvent.

The dried granules so produced form a propellant composition suitable for use in high-performance rockets and other jet-propelled devices.

EXAMPLE VI

Finely divided (about 85 percent through 200 mesh) technical grade manganese dioxide containing about 85 percent $MnO_2$ in the amount of 70 parts by weight and 30 parts by weight of finely divided aluminum (95 percent through 200 mesh) were combined in intimate admixture by dry screening and blending.

The propellant composition prepared was tested in a rocket constructed from a section of steel tubing having an overall length of 24 inches and having an inside diameter of 1 inch and an outside diameter of 1⅛ inches. The forward end of the rocket was closed off by means of a steel plug welded into place and in the exhaust end of the rocket there was installed a convergent-divergent plaster-of-Paris nozzle with the diverging throat having an angle of about 30°. At the exhaust end of the rocket three triangular steel fins spaced equi-angularly, were brazed to the outside of the rocket body.

A total of 400 grams of the propellant composition of this example was charged into the rocket and the rocket which with the propellant charge weighed 1587 grams was then placed on a firing stand. The burning surface area to nozzle throat area was 16:1. The rocket was fired at an 85 degree angle, ignition of the propellant charge being achieved by means of a nichrome wire heated by passage of an electric current through it. Maximum altitude reached by the rocket was approximately 2400 feet.

What is claimed is:

1. A solid propellant composition consisting essentially of an intimate admixture of about 10 to about 40 percent by weight of a light metal selected from the group consisting of lithium, beryllium and aluminum, from about 89 to about 45 percent of an oxide of a metal selected from the group consisting of cobalt, manganese, chromium and copper and from about 1 to about 15 percent by weight of a binder selected from the group consisting of cellulose nitrate and natural rubber.

2. The solid propellant composition of claim 1 wherein the light metal is aluminum.

3. The solid propellant composition of claim 1 wherein the oxide is cupric oxide.

4. The solid propellant composition of claim 1 wherein the oxide is manganese dioxide.

5. The solid propellant composition of claim 1 wherein the binder is cellulose nitrate.

6. The solid propellant composition of claim 1 wherein the binder is natural rubber.

7. The method of developing thrust which comprises ejecting from a reaction chamber the reaction products produced by combustion in said reaction chamber of a propellant composition consisting of an intimate admixture of from about 10 to about 40 percent by weight of a light metal selected from the group consisting of lithium, beryllium and aluminum from about 89 to about 45 percent of an oxide of a metal selected from the group consisting of cobalt, manganese, chromium and copper and from about 1 to about 15 percent by weight of a binder selected from the group consisting of cellulose nitrate and natural rubber.

8. The method of claim 7 wherein the light metal is aluminum.

9. The method of claim 7 wherein the oxide is cupric oxide.

10. The method of claim 7 wherein the oxide is manganese dioxide.

11. The method of claim 7 wherein the binder is cellulose nitrate.

12. The method of claim 7 wherein the binder is natural rubber.

References Cited in the file of this patent
UNITED STATES PATENTS

| | | |
|---|---|---|
| 2,500,097 | Soffel | Mar. 7, 1950 |
| 2,597,641 | Hull | May 20, 1952 |
| 2,889,218 | Hiskey et al. | June 2, 1959 |
| 2,926,613 | Fox | Mar. 1, 1960 |
| 2,953,443 | Lloyd | Sept. 20, 1960 |

OTHER REFERENCES

Bebie: "Manual of Explosives, Military Pyrotechnics and Chemical Warfare Agents," The Macmillan Co., N.Y. (1943), page 147.